United States Patent
Lester et al.

(10) Patent No.: US 10,934,646 B2
(45) Date of Patent: Mar. 2, 2021

(54) SOY PROTEIN AND CARBOHYDRATE CONTAINING BINDER COMPOSITIONS

(71) Applicant: JOHNS MANVILLE, Denver, CO (US)

(72) Inventors: Uranchimeg Lester, Littleton, CO (US); Kiarash Alavi, Littleton, CO (US); Jawed Asrar, Englewood, CO (US); Zhihua Guo, Ottawa Hills, OH (US); Mingfu Zhang, Englewood, CO (US)

(73) Assignee: Johns Manville, Denver, CO (US)

( * ) Notice: Subject to any disclaimer, the term of this patent is extended or adjusted under 35 U.S.C. 154(b) by 62 days.

(21) Appl. No.: 16/155,960

(22) Filed: Oct. 10, 2018

(65) Prior Publication Data

US 2019/0048501 A1 Feb. 14, 2019

Related U.S. Application Data

(62) Division of application No. 13/675,548, filed on Nov. 13, 2012, now Pat. No. 10,208,414.

(51) Int. Cl.
*C09J 189/00* (2006.01)
*D04H 13/00* (2006.01)
(Continued)

(52) U.S. Cl.
CPC .............. *D04H 13/008* (2013.01); *C08L 1/02* (2013.01); *C08L 1/284* (2013.01); *C08L 3/02* (2013.01); *C08L 5/00* (2013.01); *C08L 21/02* (2013.01); *C08L 61/24* (2013.01); *C08L 89/00* (2013.01); *C09J 189/00* (2013.01); *D04H 1/4218* (2013.01); *D04H 1/4242* (2013.01); *D04H 1/587* (2013.01); *D04H 1/64* (2013.01);
(Continued)

(58) Field of Classification Search
CPC .... D04H 13/008; D04H 1/4218; C08L 89/00; C09J 189/00
See application file for complete search history.

(56) References Cited

U.S. PATENT DOCUMENTS 4,345,063 A * 8/1982 North .................. C08G 12/26
528/245
7,829,611 B2 11/2010 Kelly
(Continued)

FOREIGN PATENT DOCUMENTS

EP 345566 A1 5/1989
EP 2 341 095 A1 7/2011
(Continued)

OTHER PUBLICATIONS

Eldridge, A.C., et al. "Carbohydrate composition of soybean flour, protein concentrates, and isolates," J. Agric. Food Chem., 1979, 27, 799-802.
(Continued)

*Primary Examiner* — Nicholas E Hill
(74) *Attorney, Agent, or Firm* — Robert D. Touslee

(57) ABSTRACT

Soy protein and carbohydrate containing binder compositions are described. The binder compositions may include a carbohydrate, a nitrogen-containing compound, and a soy protein. The binder compositions may also optionally include thickening agents such as modified celluloses and polysaccharides.

12 Claims, 6 Drawing Sheets top bottom

(51) Int. Cl.
| | |
|---|---|
| D04H 1/4218 | (2012.01) |
| D04H 1/587 | (2012.01) |
| D04H 1/4242 | (2012.01) |
| D04H 1/64 | (2012.01) |
| D21H 13/40 | (2006.01) |
| D21H 23/48 | (2006.01) |
| D21H 19/50 | (2006.01) |
| C08L 1/02 | (2006.01) |
| C08L 1/28 | (2006.01) |
| C08L 3/02 | (2006.01) |
| C08L 5/00 | (2006.01) |
| C08L 61/24 | (2006.01) |
| C08L 89/00 | (2006.01) |
| C08L 21/02 | (2006.01) |

(52) U.S. Cl.
CPC ............. *D21H 13/40* (2013.01); *D21H 19/50* (2013.01); *D21H 23/48* (2013.01); *Y10T 442/60* (2015.04)

(56) References Cited

U.S. PATENT DOCUMENTS

| | | |
|---|---|---|
| 8,680,224 B2 | 3/2014 | Zhang et al. |
| 2007/0006775 A1 | 1/2007 | Helwig et al. |
| 2007/0082187 A1 | 4/2007 | Wang et al. |
| 2010/0129640 A1 | 5/2010 | Kelly |
| 2010/0147477 A1 | 6/2010 | Nandi et al. |
| 2010/0222566 A1 | 9/2010 | Fosdick et al. |
| 2011/0039111 A1 | 2/2011 | Shooshtari |
| 2011/0086567 A1 | 4/2011 | Hawkins et al. |
| 2011/0165398 A1* | 7/2011 | Shoemake ............... C08J 5/043 428/220 |
| 2011/0190425 A1* | 8/2011 | Swift ......................... C08J 5/04 524/35 |
| 2011/0268915 A1 | 11/2011 | Zhang et al. |
| 2012/0058701 A1 | 3/2012 | Zhang et al. |
| 2012/0149813 A1 | 6/2012 | Kelly |
| 2013/0327250 A1 | 12/2013 | Shooshtari |

FOREIGN PATENT DOCUMENTS

| | | |
|---|---|---|
| EP | 2 354 205 A1 | 8/2011 |
| EP | 2 634 221 A1 | 9/2013 |
| WO | 2011019593 A1 | 2/2011 |
| WO | 2011019597 A1 | 2/2011 |
| WO | 2011044490 A1 | 4/2011 |
| WO | 2013079680 A1 | 6/2013 |

OTHER PUBLICATIONS

Sugar & Sweeteners, Report from the USDA, http://www.ers.usda.gov/topics/crops/sugar-sweeteners/backgroumd.aspx, accessed on Aug. 25, 2015.

Reddy, N., et al., "Alkali-Catalyzed Low Temperature Wet Crosslinking of Plant Proteins Using Carboxylic Acids." Biotechnol. Prog., 2009, 25, 139-146.

Svec, Jan., et al "Anion-Free Bambus [6] uril and Its Supramolecular Properties." Chemistry—A European Journal 17.20 (2011): 5605-5612.

M. Choct et al., Soy Oligosaccharides and Soluble Non-starch Polysaccharides: A Review of Digestion, Nutritive and Antinutritive Effects in Pigs and Poultry. Asian-Aust. J. Anim. Sci. vol. 23, No. 10: 1386-1398 Oct. 2010.

* cited by examiner top bottom top bottom

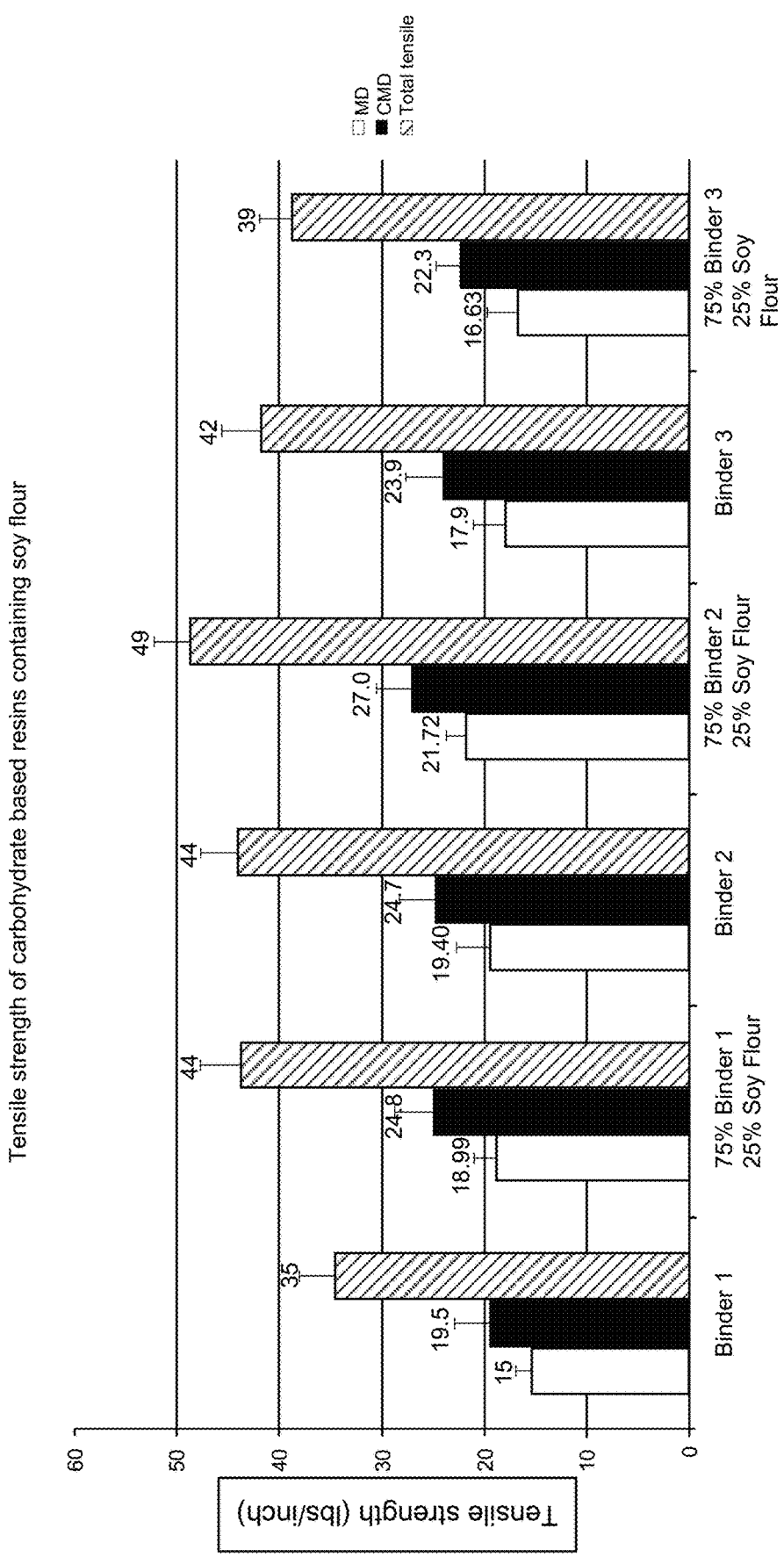

SOY PROTEIN AND CARBOHYDRATE CONTAINING BINDER COMPOSITIONS

CROSS-REFERENCE TO RELATED APPLICATIONS

This application is a division of pending U.S. application Ser. No. 13/675,548 filed Nov. 13, 2012. The entire contents of the above-identified application is herein incorporated by reference for all purposes.

FIELD OF THE INVENTION

Soy protein and carbohydrate containing binder compositions are described. The binder compositions are useful to adhere together fibers, such as glass fibers, in processes of making binder-containing fiber composites, such as glass mats.

BACKGROUND OF THE INVENTION

For decades urea formaldehyde (UF) binder compositions have been used to make glass fiber mats for building materials, including insulation, flooring, siding, facers, and roofing shingles. UF binders were favored for these materials because of their low cost and acceptable strength properties. For materials like roofing shingles, the UF in the binder compositions were often blended with more flexible latex polymers such as polyvinyl acetate, vinyl acrylic and/or styrene butadiene polymers. The latexes in the binders gave the shingles increased tensile and tear strength, as well as improved moisture resistance properties.

More recently, the construction industry has moved away from formaldehyde-based binder compositions. Formaldehyde is considered a probable human carcinogen, as well as an irritant and an allergen, and its use in binder formulations for building products, textiles, upholstery, and other materials is increasingly restricted. Thus, makers of building materials have been developing alternative binder formulations that are formaldehyde free.

Alternative binder systems that have received considerable attention include those that use renewable feedstocks. In addition to being formaldehyde-free, these binder formulations based on renewable feedstocks can be made from renewably grown materials instead of non-renewable, petroleum-based feedstocks.

These alternative binder compositions that use renewable binder feedstocks have been used as the binder component of fiberglass batt insulation for houses and buildings. This type of insulation is typically made by drawing molten streams of glass into fibers of random length and depositing them onto a moving conveyor belt below the chamber. The binder composition is sprayed on the fibers before they are drawn onto the conveyor belt, and then dried and cured by flowing air over the binder-coated fibers, which are still hot after just being formed.

The relatively low viscosity of many binder compositions using renewable feedstocks have not been a problem in the production of blown fiberglass bat insulation which is sprayed in relatively low concentrations and quickly dried and cured. However, the low viscosity of these binder compositions has created more difficulties in the production of glass fiber mats, where too much of the free-flowing binder can migrate to the bottom of the mat leaving the fibers on top with too little binder coverage.

Many of these binder compositions are diluted in significant quantities of water when applied onto the glass fiber mat, so one approach to increasing their viscosity has been to concentrate the feedstock materials in less water. However, this approach brings significant challenges for the process control of mat manufacturing. Typically, a binder with less than 20 wt. % solids is used to achieve an loss-on-ignition (LOI) of 15-25 wt. % on a glass mat. A significant increases in the wt. % solids in the binder leads to difficulties for the control of the mat weight and especially LOI. In addition, a higher wt. % solids in some cases may result in a non-uniform coating of the mat. Thus, there is a need for new binder formulations that address these viscosity challenges. This and other issues are explored in the present application.

BRIEF SUMMARY OF THE INVENTION

Soy protein and carbohydrate-containing binder compositions are described that address viscosity challenges presented in many carbohydrate-containing binder formulations. The present binder composition may also include one or more nitrogen-containing crosslinking agents that polymerize into a water-insoluble glass fiber binder when cured. The binder compositions may be used as formaldehyde-free substitute binders to make glass fiber mats that are incorporated into a variety of products including building materials (e.g., glass fiber reinforced roofing shingles; facers for insulation, office partition panels; backing mat for flooring and/or carpets; etc.), battery separators, and filtration media for air, water, and oil, among other materials.

Binders made primarily or exclusively from soy protein often have superior total tensile strength, but lower than desired hot/wet tensile strength. Thus, glass mats made from binder compositions of soy protein perform well in dry environments, but perform worse than other mats under hot and humid conditions. Conversely, carbohydrate-based binder compositions that include carbohydrates and a nitrogen-containing crosslinking agent often have superior hot/wet retention (e.g., greater than 90%). Soy proteins' many active functional groups (e.g., $-NH_2$, $-COOH$) may participate in the crosslinking of carbohydrates to increase the total tensile strength of the cured binder. Thus, the combination of soy protein with carbohydrate-based binder compositions can increase a mat's total tensile strength without unacceptable levels of hot/wet tensile strength.

The amount of soy protein in the binder may range from 0.5 wt. % to 75 wt. % of the binder composition (e.g., 10 wt. % to 50 wt. %; 15 wt. % to 35 wt. %; etc., of soy protein in the binder composition). Soy protein added to a carbohydrate-based binder composition at these concentration levels can increase the viscosity of the binder composition, particularly at low shear rates. For example, a soy-free, carbohydrate-containing binder composition may have a viscosity of 1 to 2 centipoise (e.g., less than 3 cPs) as measured with a Brookfield viscometer using spindle 18 at 60 rpm and 20° C. Adding soy protein to the binder composition can increase its viscosity, particularly at lower shear rates (e.g., 0.1 to 1 $sec^{-1}$), by two, five, or even ten times. The soy-containing binder compositions may also optionally include one or more thickening agents (or thickeners) to further increase viscosity, and/or extend an increased shear viscosity across higher shear rates.

When the viscosity of a binder composition is too low (e.g., less than 3 centipoise (cPs) as measured with a Brookfield viscometer using spindle 18 at 60 rpm and 20° C.) the liquid binder tends to migrate too quickly towards the bottom side of the mat and leaves the top side without adequate binder coverage. The inadequate binder coverage on top can have a number of deleterious effects on the finished mat, including reduced laminate strength and total tensile strength.

Present embodiments include soy-containing binder compositions comprising a carbohydrate, a nitrogen-containing compound, and a soy protein.

Present embodiments may further include process of making a non-woven glass fiber mat. The processes may include the step of forming an aqueous dispersion of fibers. The dispersion may be passed through a mat forming screen to form a wet mat. A soy-containing binder composition may be applied to the wet mat to form a binder-containing wet mat, and the binder-containing wet mat may be cured to form the non-woven glass fiber mat. The soy-containing binder composition may include a carbohydrate, a nitrogen-containing compound, and a soy protein.

Another exemplary processes of making a non-woven glass fiber mat includes making a slurry of glass fiber by adding the fiber to white water in a pulper. The white water disperses the fiber in the slurry, which may have a fiber concentration of about 0.2-1.0 weight %. The slurry may be metered into a flow of white water and the metered mixture may be deposited on to a wire mesh moving screen to dewater and form a wet nonwoven fibrous mat. The wet nonwoven mat of glass fiber may then be transferred to a second moving screen and run through a binder application saturating station where a soy-containing binder composition may be applied to the mat. This may be followed by sucking off the excess binder composition, drying wet mat and curing (polymerizing) the binder which bonds the fibers together in the mat.

The soy-containing binder composition may be applied by a number of techniques, including a curtain coating, a dip and squeeze techniques, and spraying. The wet mat may be dried and cured in an oven at a binder curing temperature (e.g., 250-500° F.). Drying and curing times may range from seconds (e.g., 2-10 seconds) to minutes (e.g., 1-5 minutes).

Alternative mat-forming processes may also be used, such as cylinder forming and "dry laying" using carding or random fiber distribution. Aspects of these processes are described in U.S. Pat. Nos. 4,112,174; 4,681,802; and 4,810,576, the entire contents of which are herein incorporated by reference for all purposes.

Present embodiments may still further include glass fiber mats having glass fibers and a binder. The binder has cured products from a soy-containing binder composition that includes a carbohydrate, a nitrogen-containing compound, and a soy protein.

Additional embodiments and features are set forth in part in the description that follows, and in part will become apparent to those skilled in the art upon examination of the specification or may be learned by the practice of the invention. The features and advantages of the invention may be realized and attained by means of the instrumentalities, combinations, and methods described in the specification.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sublabel is associated with a reference numeral and follows a hyphen to denote one of multiple similar components. When reference is made to a reference numeral without specification to an existing sublabel, it is intended to refer to all such multiple similar components.

FIG. 6 shows a graph of measured tensile strengths for a series of binders, some of which contain a soy protein.

DETAILED DESCRIPTION OF THE INVENTION

Figure 1:
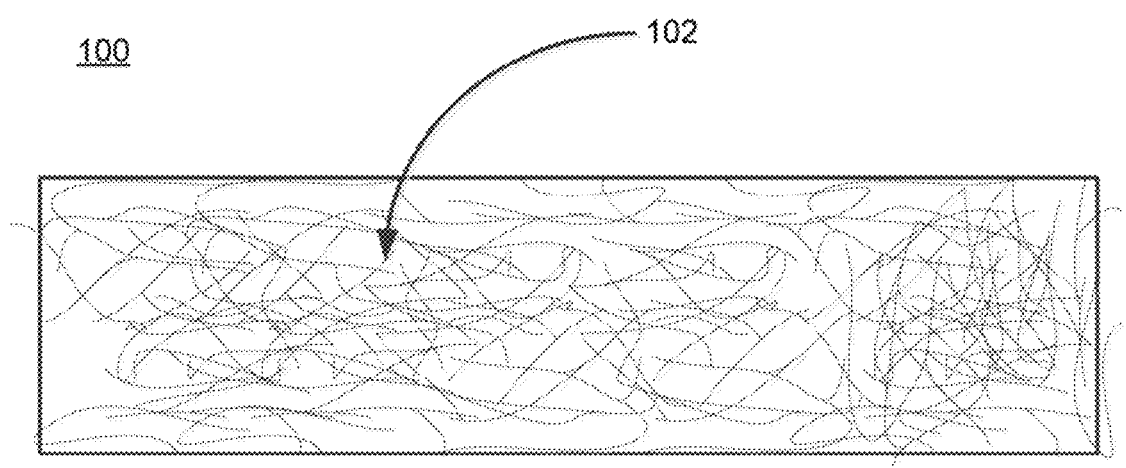
FIG. 1 shows an exemplary cross-section of glass fiber mat according to embodiments of the invention.

Soy protein and carbohydrate-containing binder compositions for use as adhesive binder formulations for glass fiber mat products are described. These soy protein and carbohydrate-containing binder compositions may have a slower migration of the liquid binder composition towards the bottom portion of the glass fiber mat when using, for example, a falling-film curtain coater binder application technique. This permits a more controlled distribution of the binder composition through the entire thickness of the mat. A more homogeneous distribution of the binder in the final fiber mat product has been shown to improve a variety of the mat's properties, including tensile and tear strength in both the machine and cross-machine directions, and delamination strength, among other properties.

Exemplary Binder Compositions and their Rheological Properties

The present soy-containing binder compositions may include one or more types of carbohydrate, nitrogen-containing compounds, and soy protein, among other binder components. They may also optionally include one or more thickening agents, such as modified celluloses and polysaccharides. When the binder compositions are cured, the carbohydrates and nitrogen-containing compounds form a crosslinked polymer that in some instances is referred to as a Maillard polymerization product. The soy proteins may also crosslink with the carbohydrates (as well as themselves) to further increase the total tensile strength of the cured composite (e.g., a glass fiber mat).

The soy protein may be include one or more of soy flour, soy protein concentrate, soy protein isolate, and/or soy polymer, among other forms of soy protein. Soy flour may be produced by grinding soybeans into a powder. Soy flour may retain the natural oils and other compounds from the soybeans; or, may be defatted to produce flour with a higher protein content (e.g., greater than 50 wt. %). Soy protein concentrate and isolate are progressively more concentrated forms of soy protein, with the concentrate typically having 70 wt. % soy protein and the isolate typically having 90 wt. % or more soy protein. Soy polymers may be made from chemically-modified soy proteins having moieties that facilitate the proteins' polymerization.

The soy protein may be denatured or modified to unfold the protein molecules in the dispersion. Upon unfolding, the functionalities of the protein molecules (e.g., carboxyl, hydroxyl, amine) are exposed and may actively react with other binder ingredients to form crosslinking bonds. Examples of protein denaturation and modification methods can include heat treatment, treatment with chaotropic agents (e.g., urea, guanidinium chloride, lithium perchlorate, etc.), acids, bases, metal salts, alcohols, detergents, thiols, and sulfites, among other materials.

The relative amount of soy protein added to the binder composition may vary depending on the target viscosity and the other binder components. Exemplary soy protein concentrations may range from 0.5 wt. % to 75 wt. % of the binder composition. Additional exemplary concentration ranges may include 20 wt. % to 50 wt. %.

The optional thickening agents may be polymeric materials and may be partially or fully water soluble. They are selected to further enhance the binder compositions rheological properties (e.g., increase the composition's viscosity and surface tension) without substantially interfering with the composition's curability into an adhesive binder for the substrate fibers. Exemplary thickening agents may include polysaccharides, such as xanthan gum, guar gum, modified starches and the like; neutralized polyacrylic acid, such as sodium polyacrylate, modified celluloses, such as hydroxyethyl cellulose (HEC), carboxymethyl cellulose (CMC), as well as their soluble salts, polyacrylamides, and polyvinyl alcohols. The exemplary thickening agents may have a weight average molecular weight typically from 100,000 to 2,000,000 g/mol (e.g., 200,000 to 1,000,000 g/mol). The thickening agent (or agents) are typically added to the binder composition prior to its deposition on the fiber substrate, or alternatively may be added separately and approximately simultaneously with the other components of the binder composition to the fiber substrate.

The concentration of thickening agent in the binder composition generally depends at least in part on the concentration of the soy protein. The soy-containing binder compositions may be aqueous mixtures or solutions, and their viscosities depend in part on the how much the polymer precursors have been diluted by the water. For example, some concentrated binder compositions (e.g., solids concentrations of 45 to 70 wt. % or more) may have viscosities in the hundreds of centipoise at room temperature. The concentrated resins are typically diluted with water to, for example, a solids concentration of 10 to 30 wt. % solids (e.g., 10 to 20 wt. % solids), reducing the binder composition's viscosity to less than 3 cPs at room temperature. Other binder compositions may have functional viscosities at high concentrations (e.g., 20 cPs at 50 wt. % solids concentration) but should be diluted to address processing challenges such as LOI, weight, and uniformity problems for the applied binder composition.

The binder compositions may also contain a surfactant that provides more precise control over the surface tension of the composition. The surfactant may be added in amounts to achieve a surface tension for the binder composition of 35 to 50 mN/m (e.g., 38 to 48 mN/m, 40 to 47 mN/m, etc.). These surfactants may include cationic, anionic, and/or non-ionic surfactants.

The binder formulations of the soy-containing binder compositions may include one or more types of carbohydrates and nitrogen-containing compounds. The nitrogen-containing compounds may act as crosslinking agents for the carbohydrates in the cured binder. The carbohydrates used in the binder formulations may include reducing sugars that contain at least one aldehyde group, or are capable of forming an aldehyde group through isomerization. Exemplary reducing sugars may include glucose (dextrose), fructose, glyceraldehyde, galactose, allose, xylose, ribose, maltose, cellobiose, and lactose, among others.

The nitrogen-containing compounds may include a variety of compounds that can distinguish the class of binder formulation. One class of binder formulations uses an amino-amide as the nitrogen containing compound, which itself is a reaction product of an amine with a saturated or unsaturated reactant. Another class of binder formulations has as the nitrogen-containing compound a reaction product of a urea compound and aldehyde-containing compound. These and other classes of nitrogen-containing compounds are described more detail below.

1. Carbohydrate/Amino-Amide Binder Formulations

The nitrogen-containing compounds may include amines capable of undergoing conjugate addition with a saturated or unsaturated reactant to form an amino-amide. The amino-amide then reacts during curing with the carbohydrate to form a polyimide. The amino-amide addition products may be formed by mixing the amine and saturated or unsaturated reactant in an aqueous medium at room temperature. The resulting addition products are either water-soluble, water-dispersible, or are present as an emulsion. In some binder formulations, the formation of the amino-amide from the reaction of the amine precursor with the saturated or unsaturated reactant may occur before the introduction of the carbohydrate, while other formulations mix all three precursors (i.e., the amine, saturated or unsaturated reactant, and carbohydrate) before the amino-amide is formed.

Each amine may have two or more primary and/or secondary amine groups to react and crosslink two or more carbohydrate molecules. The amines may include aliphatic, cycloaliphatic and aromatic amines. They may be linear or branched, and have additional functionalities and linkages such as alcohols, thiols, esters, amides, acids, and ethers, among others. Exemplary amines may include 1,2-diethylamine, 1,3-propanediamine, 1,4-butanediamine, 1,5-pentanediamine, 1,6-hexanediamine, α,α'-diaminoxylene, diethylenetriamine, triethylenetetramine, tetraethylenepentamine, as well as combinations of two or more of these amines. Natural and synthetic amino acids such as lysine, anginine, hestidine, etc., may also be used.

The curable amino-amide is formed through the selection of an unsaturated or saturated reactant that is an anhydride, carboxylic acid, ester, and salts and mixtures of such reactants. These unsaturated reactants may include maleic acid, fumaric acid, maleic anhydride, mono- and di-esters of maleic acid and fumaric acid, and salts and mixtures of these. Ammonium salts of the unsaturated acids of their monoesters conveniently can be utilized. Saturated reactants may include, without limitation, succinic anhydride, succinic acid, mono and diesters of succinic acid, glutaric acid and anhydride, phthalic acid and anhydride, tetrahydro phthaic acid and anhydride, mono and diesters of acid anhydrides and salts of the acids, and their mono esters.

In some formulations, the amino-amide product may be oligomerized before reacting with the carbohydrate. This oligomerization may be facilitated by heating the amino-amide solution until the amino-amide is dimerized, trimerized, tetramerized, etc., into the amino-amide oligomer. The heating conditions may include raising the temperature of the amino-amide solution to, for example, 120° C. to 150° C. for a time of up to 5 hours. In some instances, the oligomerized amino-amide product forms a stronger, more rigid cured binder product than then amino-amide monomer.

Then during the binder curing step, the majority of the carbohydrate reacts with the amino-amide intermediate, which contains an amic acid functional group, (i.e., an amide linkage in the vicinity of a carboxylic acid). An amic acid functional group is typically more reactive than a simple carboxylic acid. The amount of carbohydrate added is generally such that the molar ratio of carboxylic acid in the amino-amide to carbonyl or ketone in the carbohydrate is from 1:5 to 50:1, for example a ratio of 1:20 to 20:1, or a ratio of 1:10 to 10:1. Additional details about carbohydrate/amino-amide binder formulation are described in Applicant's U.S. Pat. No. 9,365,963, issued Jun. 14, 2016, and titled "Curable Fiberglass Binder," the entire contents of which are herein incorporated by reference for all purposes.

2. Carbohydrate/Urea Derivative Binder Formulations

The nitrogen-containing compounds may include urea derivative reaction products of urea (i.e., $H_2N$—CO—$NH_2$), and/or substituted ureas, with diformaldehyde compounds such as glyoxal. One specific class of these urea derivatives include imidazolidine compounds such as 4,5-dihydroxy-imidazolidin-2-one, which has the chemical structure:

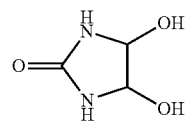

4,5-dihydroxyimidazolodin-2-one

More specifically, the urea compound may be a substituted our unsubstituted urea having the formula:

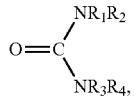

where $R_1$, $R_2$, $R_3$, and $R_4$ are independently chosen from a hydrogen moiety (H), an alkyl group, an aromatic group, an alcohol group, an aldehyde group, a ketone group, a carboxylic acid group, and an alkoxy group. Exemplary alkyl groups include straight-chained, branched, or cyclic hydrocarbons of varying size (e.g., $C_1$-$C_{12}$, $C_1$-$C_8$, $C_1$-$C_4$, etc.). Exemplary aromatic (i.e., aryl) groups include substituted or unsubstituted phenyl moieties, among other aromatic constituents. Exemplary alcohol groups include —ROH, where R may be a substituted or unsubstituted, saturated or unsaturated, branched or unbranched, cyclic or acyclic, organic moiety. For example, R may be —(CH2)$_n$, where n may be 1 to 12. Exemplary alcohols may also include polyols having two or more hydroxyl groups (—OH) in alcohol group. Exemplary aldehyde groups include —RC(=O)H, where R may be a monovalent functional group (e.g., a single bond), or a substituted or unsubstituted, saturated or unsaturated, branched or unbranched, cyclic or acyclic, organic moiety, such as —(CH2)$_n$, where n may be 1 to 12. Exemplary ketone groups may include —RC(=O)R' where R and R' can be variety of carbon containing constituents. Exemplary carboxylic acid groups may include —R—COOH, where R may be a monovalent functional group, such as a single bond, or a variety of carbon-containing constituents. Exemplary alkoxy groups include —OR$_x$, where R$_x$ is an alkyl group.

The aldehyde-containing compound may contain one or more aldehyde functional groups. Exemplary aldehyde-containing compounds include acetaldehyde, propanaldehyde, butyraldehyde, acrolein, furfural, glyoxal, gluteraldehyde, and polyfurfural among others. Exemplary aldehyde-containing compounds may also include substituted glyoxal compounds having the formula:

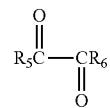

where $R_5$ and $R_6$ may be independently hydrogen (H), an alkyl group, an aromatic group, an alcohol group, an aldehyde group, a ketone group, a carboxylic acid group, and an alkoxy group, among other groups.

The reaction products of the urea compound and the aldehyde-containing compound may include an imidazolidine compound having the formula:

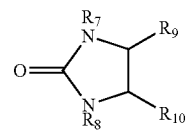

where $R_7$, $R_8$, $R_9$, and $R_{10}$ are independently, —H, —OH, —$NH_2$, an alkyl group, an aromatic group, an alcohol group, an aldehyde group, a ketone group, a carboxylic acid group, and an alkoxy group. In one specific example of the reaction between urea and glyoxal, the reaction product may be 4,5-dihydroxyimidazolidin-2-one.

The carbohydrate/urea derivative binder formulations may also include one or more catalysts to increase the rate of the crosslinking reactions between the carbohydrates and crosslinking agents when the composition is exposed to curing conditions. Exemplary catalysts may include alkaline catalysts and acidic catalysts. The acidic catalysts may include Lewis acids (including latent acids and metallic salts), as well as protic acids, among other types of acid catalysts. Lewis acid catalysts may include a salt of a deprotonized anion such as a sulfate, sulfite, nitrate, nitrite, phosphate, halide, or oxyhalide anion in combination with one or more metallic cations such as aluminum, zinc, iron, copper, magnesium, tin, zirconium, and titanium. Exemplary Lewis acid catalysts include aluminum sulfate, ferric sulfate, aluminum chloride, ferric chloride, aluminum phosphate, ferric phosphate, and sodium hypophosphite (SHP), among others. Exemplary latent acids include acid salts such as ammonium sulfate, ammonium hydrogen sulfate, mono and dibasic ammonium phosphate, ammonium chloride, and ammonium nitrate, among other latent acid catalysts. Exemplary metallic salts may include organo-titanates and organo-zirconates (such as those commercially manufactured under the tradename Tyzor® by DuPont), organo-tin, and organo-aluminum salts, among other types of metallic salts. Exemplary protic acids include sulfuric acid, phosphoric acid, hydrochloric acid, nitric acid, sulfonic acid compounds (i.e., R—S(=O)$_2$—OH) such as p-toluenesulfonic acid and methanesulfonic acid, and carboxylic acids, among other protic acids. Catalyst compositions may also include combinations of two or more catalysts, for example the combination of ammonium sulfate and diammonium phosphate.

The pH of the present binder compositions may vary depending upon the types and relative concentrations of the components used. Typically the pH of the present binder compositions are slightly acidic to alkaline with a pH range of about 6 to 8 (e.g., 6.5 to 7.5). The binder compositions have a pH that creates relatively little or no acid-based corrosion of metal fabrication equipment.

The reaction product of the urea derivative nitrogen-containing compound acts as a crosslinking agent for the carbohydrate. During a curing stage, the urea derivative can bond to two or more carbohydrates (either polymerized or unpolymerized) to form a crosslinked, polymeric cured binder.

The molar ratio of the (1) crosslinking reaction product of the urea compound and the aldehyde-containing compound to (2) the carbohydrate generally ranges from 1:2 to 1:50. Exemplary ratios of crosslinking agent to carbohydrate include a range from 1:4 to 1:10. Additional details about carbohydrate/urea derivative binder formulations are described in Applicant's pending U.S. application Ser. No. 13/490,638, filed Jun. 7, 2012, and titled "Formaldehyde-Free Binder Compositions with Urea-Formaldehyde Reaction Products," the entire contents of which are herein incorporated by reference for all purposes.

3. Carbohydrate/Nitrogen-Containing Salt Binder Formulations i. Salts of Inorganic Acids with Amines In additional soy-containing binder formulations, the nitrogen-containing compounds may include a nitrogen-containing salt. For example, the nitrogen-containing compound may include the salt product of the combination of an inorganic acid and an amine (e.g., an amine-acid salt). Exemplary inorganic acids may include a phosphorous-containing acid such as phosphoric acid, pyrophosphoric acid, phosphorous acid, and phosphine, among others. Exemplary inorganic acids may also include oxygenated inorganic acids such as sulfuric acid, sulfurous acid, nitric acid, boric acid, hypochloric acid, chlorate acid, among others. They may also include non-oxygenated inorganic acids such as hydrochloric acid and hydrogen sulfide, among others.

Exemplary amines may include polyamines (e.g., diamines, triamines, etc.) having at least one primary amine group. For example, the amines may include ethylene diamine, 1,3-propanediamine, 1,4-butanediamine, 1,5-pentanediamine, 1,6-hexanediamine, α,α'-diaminoxylene, diethylenetriamine, triethylenetetramine, tetraethylenepentamine, as well as combinations of two or more of these amines.

When the amine-acid salt reacts with the carbohydrate under binder curing conditions the binder is formed. Exemplary binder systems include the combination of an amine-acid salt of 1,6-hexanediamine and phosphoric acid with the carbohydrate dextrose (HPD), the combination of an amine-acid salt formed from the combination of ethylene diamine and phosphoric acid with dextrose (EPD). Additional details about these amine-acid salt and carbohydrate binder formulations are described in Applicant's U.S. application Ser. No. 12/539,211, filed Aug. 11, 2009, now abandoned, the entire contents of which are herein incorporated by reference for all purposes.

ii. Salts of Inorganic Acids with Amines and Organic Species

Some carbohydrate/amine-acid salt binder formulations further include some combination of an organic acid, organic anhydride, and/or an alkanol amine. Exemplary organic acids may include polycarboxylic acid such as citric acid and or maleic acid. Exemplary organic anhydrides may include maleic anhydride, phthalic anhydride, methylphthalic anhydride, glutaric anhydride, tetrahydrophthalic anhydride, perhydrophthalic anhydride, itaconic anhydride, succinic anhydride, and trimellitic anhydride, among other anhydrides.

Exemplary alkanol amines may have the formula:

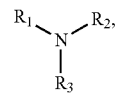

where $R_1$, $R_2$, and $R_3$ are independently chosen from, a hydrogen, a $C_{1-10}$ alkyl group, an aromatic group, and a $C_{1-10}$ hydroxy alkyl group, and wherein at least one of $R_1$, $R_2$, and $R_3$ is a hydroxyl alkyl group.

Specific examples of alkanol amines may include methanol amines such as mono-, di-, and tri-, methanol amine; ethanol amines such as monoethanol amine (MEA), diethanol amine (DEA), and triethanol amine (TEA); isopropanol amines such as mono-, di-, and tri-, isopropanol amine; methyldiethanol amine; ethyldiethanol amine; propyldiethanol amine; isopropyldiethanol amine; and n-butyldiethanol amine, among others.

Exemplary soy-containing binder formulations may include the combination of a carbohydrate, amine-acid salt, and organic acid. These include binder formulations of dextrose, ethylene diamine phosphate, and citric or maleic acid. Additional details about these carbohydrate/amine-acid salt/organic acid binder formulations are described in Applicant's U.S. Pat. No. 9,676,954, issued Jun. 13, 2017, the entire contents of which are herein incorporated by reference for all purposes.

Exemplary soy-containing binder formulations may also include the combination of a carbohydrate, amine-acid salt, organic anhydride, and alkanol amine. This include binder formulations of the reaction products of monoethanol amine ("E") and maleic anhydride ("M") combined with ethylenediamine phosphate ("EP") and dextrose ("D") to make binder compositions referred to as EMEPDs. In still other exemplary binder formulations, the amine-acid salt may be eliminated. This includes formulations of the reaction products of monoethanol amine ("E") and maleic anhydride ("M") with the carbohydrate dextrose to make binder compositions referred to as EMDs. Additional details about these carbohydrate/amine-acid salt/anhydride-alkanol amine binder formulations are described in Applicant's U.S. Pat. No. 9,695,311, issued Jul. 4, 2017, the entire contents of which are herein incorporated by reference for all purposes.

Exemplary binder formulations may include additional compounds combined with the reducing sugar, organic acid, and amine salt of an inorganic acid. For example, urea may also be included with the other binder components. Exemplary, urea-containing binder compositions may include ethylene diamine phosphate ("EP"), citric acid ("C"), urea ("U"), and dextrose ("D") combined to make a binder composition referred to as EPCUD. Exemplary molar ratios of these components may include Ethylenediamine:Phosphoric Acid:Citric Acid:Urea:Dextrose of 1:1:0.5:1:6.

iii. Ammonium Salts of Carboxylic Acids

In still additional soy-containing binder formulations, the nitrogen-containing compounds may include an ammonium salt of a polycarboxylic acid. Exemplary ammonium salts of polycarboxylic acids may be formed from the reaction of ammonia ($NH_3$) with the polycarboxylic acid to form the ammonium salt. It should be appreciated that other types of ammonium ions can function as the cation in the ammonium-polycarboxylate salt, such as $(NH_3R_1)^+$, $(NH_2R_1R_2)^+$, and $(NHR_1R_2R_3)^+$, where $R_1$, $R_2$, and $R_3$ are each independently chosen from an alkyl, cycloalkyl, alkenyl, cycloalkenyl, hetrocyclyl, aryl, and heteroaryl, among other organic groups.

Exemplary polycarboxylic acids may include dicarboxylic acids, tricarboxylic acids, etc. Dicarboxylic acids may include maleic acid, and tricarboxylic acids may include citric acid.

The binder formulations may include the combination of a carbohydrate (e.g., a reducing sugar) with the ammonium salt of the polycarboxylic acid. For example, the binder composition may include dextrose and triammonium citrate.

4. Carbohydrate Blends with Latex and/or Solution Polymers

This group of soy-containing binder compositions is distinguished by the inclusion of the components of a second binder in the formulation. The second binder may be a latex binder and/or solution polymer with a significantly higher viscosity than the carbohydrate binder composition. In some instances, the second binder may act as the sole thickening agent in the carbohydrate binder composition, while in other instances the second binder may complement other thickening agents to get the composition to a target viscosity.

The second binder may include latex binders having a Brookfield viscosity of about 100 cPs or more (spindle 18 operating at a speed of 60 rpm) at 20° C. Exemplary second binders may include acrylic binders, among others. The second binder may be present up to about half the weight of the total binder composition (e.g., 1 to 50 wt. %; 1 to 20 wt. %; etc.).

5. Additional Binder Components

The present soy-containing binder compositions may further include one or more additional components such as adhesion prompters, oxygen scavengers, solvents, emulsifiers, pigments, organic and/or inorganic fillers, flame retardants, anti-migration aids, coalescent aids, curing catalysts, wetting agents, biocides, plasticizers, organosilanes, anti-foaming agents, colorants, waxes, suspending agents, antioxidants, and secondary crosslinkers, among other components. In some instances, some or all of the additional components are pre-mixed with the binder composition before it is applied to fibers and cured. In additional instances, some or all of the additional components may be introduced to the curable, curing, and/or cured fiber-containing composite during or after the initial binder composition is applied to the fibers.

Exemplary Fiber-Containing Composites

The viscosity-enhanced soy-containing binder compositions may be used to make a variety of fiber-reinforced composites, including glass fiber mats for roofing shingles and facers, among other products. FIG. 1 shows an exemplary section of glass fiber mat 100 that may be used, for example, in a roofing shingle.

The glass fibers 102 used in glass fiber mat 100 can have various fiber diameters and lengths, depending on the strength and other properties desired in the mat. Exemplary glass fibers may have diameters in the range of 3 to 25 μm (e.g., 12 to 17 μm), which the collecting of fibers having roughly equal diameters or two or more different-sized diameters. Similarly, the fibers may be roughly equal in length (e.g., 0.75 to 1.25 inches in length), or may have different lengths. In some embodiments, longer fiber lengths (e.g., 3 to 5 inches) may be used in a wet process for making fiber glass mats. Even longer fiber lengths can be used in some dry processes. Generally, the longer the fiber, the higher the tensile and strengths of the mat, but the poorer the fiber dispersion.

The glass fibers may be made from a variety of glass types, including E, T and C type glass fibers. Additional types of glass may also be used including A type, S type, etc. Typically, all of the fibers used in the glass fiber mat 100 are glass fibers, while in some instances the mat 100 may include a portion of non-glass fibers. These may include inorganic fibers (e.g., graphite fibers, mineral fibers, etc.) as well as organic fibers such as nylon, polyester, polyethylene, polypropylene, etc. Typically, the non-glass fibers will not exceed 25 wt. % of the total fiber weight.

The relative weights of the binder and fibers in the composite may also vary. Typically, the soy-containing binder weight ranges from 3 wt. % to 45 wt. % of the fiber mat. Conversely, the relative weight of the fibers in the mat typically ranges from 55 wt. % to 97 wt. %.

Exemplary Processes for Making Fiber-Containing Composites

Figure 2:
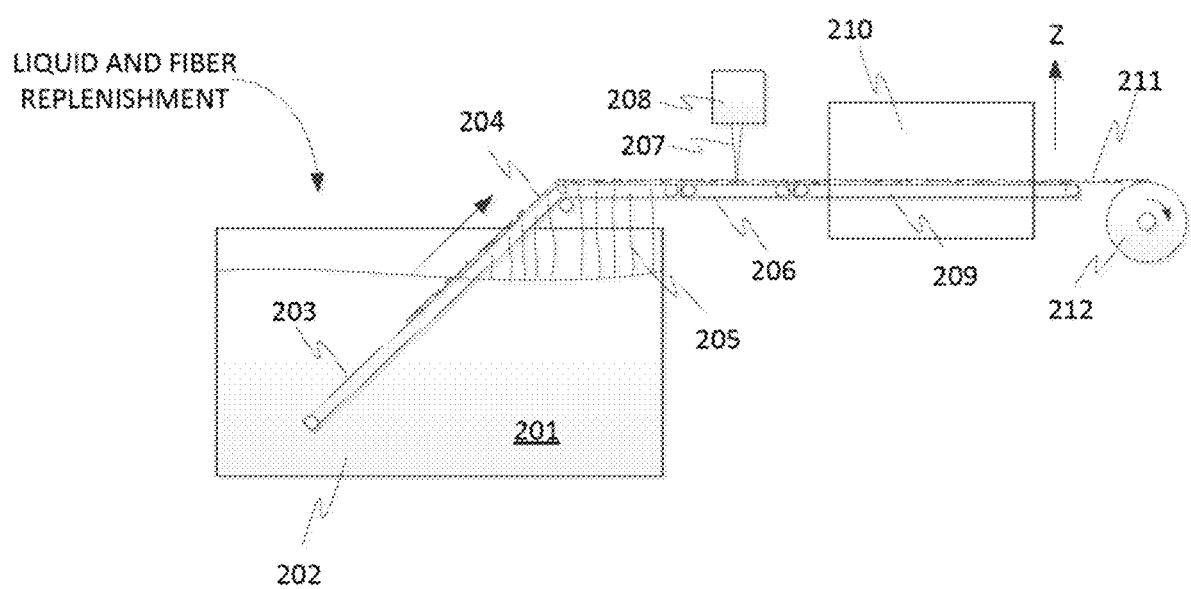
FIG. 2 shows an exemplary system for making glass fiber mats according to embodiments of the invention.

FIG. 2 illustrates a simplified schematic view of one example process for producing a glass fiber mat. In the process of FIG. 2, glass fibers are combined with whitewater 201 to form an aqueous suspension in mixing tank 202. The whitewater 201 may be a water-based mixture for treating the fibers to improve the quality and uniformity of the mat. The whitewater may include one or more thickening agents and/or dispersants that promote the homogeneity and/or cohesion of the fibers in the suspension and subsequently in the mat. Exemplary thickening agents may include hydroxyethyl cellulose, ethoxylated amines, polyacrylamides, and amine oxides, among other thickening agents. The amount of thickening agent used should be effective to provide the viscosity needed to suspend the fibers in the white water as needed to practice the method used to form the wet laid mat. The white water viscosity is generally in the range of 1 to 20 cPs, preferably 1.5 to 8 cPs (e.g., 4 to 5 cPs). The fiber slurry then is agitated to form a workable, uniform dispersion of fibers having a suitable consistency.

The white water may include dispersants, surfactants, lubricants, and defoamers, among other additives. Exemplary dispersants may include cationic surfactants such as ethoxylated tallow amines commercially available as C-61 from Cytec Industries, Inc. of Morristown, N.J. The pH of the suspension may be any acceptable pH for the processing conditions (e.g., less than 7, about 4 to about 7, etc.) and may be adjusted by the addition of acids or bases (e.g., acetic acid).

When fibers of different size are used in the mat, their different lengths and/or diameters may present competing interests to the formulation of the white water chemistry. For example, long, coarse fibers may be more effectively dispersed in a more viscous white water. However, the presence of the fine fibers may make it difficult to remove a relatively viscous white water from the mat in later stages of the wet laid process. The selected white water formulation and fiber mix preferably balance these interests.

Moisture on the glass fibers at the time they are introduced into the wet laid process, especially small diameter fibers, has a strong effect on the uniformity of the finished mat. In particular, introducing the fibers to the wet laid process in an already-wet state improves the dispersion of the fibers in the white water mixture, and results in a more uniform mat. The glass fiber may have, for example, a moisture content of about 5 to 75 percent (e.g., 5 to 35 percent). The wet fiber is then introduced into tank 202 of the wet laid process, for mixing with the white water 201.

A porous first belt 203 lifts fibers 204 from white water 201, and excess liquid 205 is allowed to fall through first belt 203, to return to tank 202. (While excess liquid 205 is shown schematically in FIG. 2 as simply falling back into tank 202, various mechanisms, for example vacuum or other techniques, may be used to facilitate the removal of liquid 205 from fibers 204.) Preferably, tank 202 is replenished with fibers and liquid as needed to maintain a proper mixture of fibers and white water 201 for continuous production.

Fibers 204 may be transferred to a second belt 206, for application of a binder. In FIG. 2, binder 207 is shown as being applied to fibers 204 using a curtain coater 208. Other binder application techniques may be used as well. For example, binder 207 may be sprayed onto fibers 204, or applied by another suitable technique.

Fibers 204, now including binder 207, may then be transferred to a third belt 209 and carried through a drying process 210. Drying process 210 may use heat, airflow, or other techniques to cure the binder composition 207 and to remove moisture from fibers 204. Drum drying/curing can also be used in place of through air drying/curing. After drying, completed mat 211 may be packaged for later use, for example by being wound onto a roll 212.

Many variations are possible. For example, more or fewer belts may be used. In some embodiments, the components of binder 207 may be added to white water 201 so that fibers 204 are infused with binder upon their emergence from tank 202, reducing (and sometimes eliminating) the need for curtain coater 208 or other binder application equipment.

As noted above, the distribution of binder within the finished mat 211 in the Z direction (i.e., vertical direction) as shown in FIG. 2 has a significant effect on the quality and later processing of mat 211. If the binder is not infused throughout mat 211, mat 211 may suffer from poor interlaminar strength. Excessive binder at or near the bottom surface of mat 211 may also interfere with proper bonding of any cover film added later to mat 211. To further facilitate uniform dispersion of the binder within the mat, the present binder compositions include one or more thickening agents to control the viscosity and may also include surfactants to control the surface tension of the composition. In addition, the curing and drying process 210 may be carried out in stages or zones. For example, the first zone or zones of an oven that is part of curing and drying process 210 may be operated at a decreased temperature, slowing the drying of fibers 204 and the migration of binder composition to the heated side of mat 211. Later oven zones are maintained at sufficient temperatures to fully dry and cure mat 211.

EXAMPLES

Figure 3A:
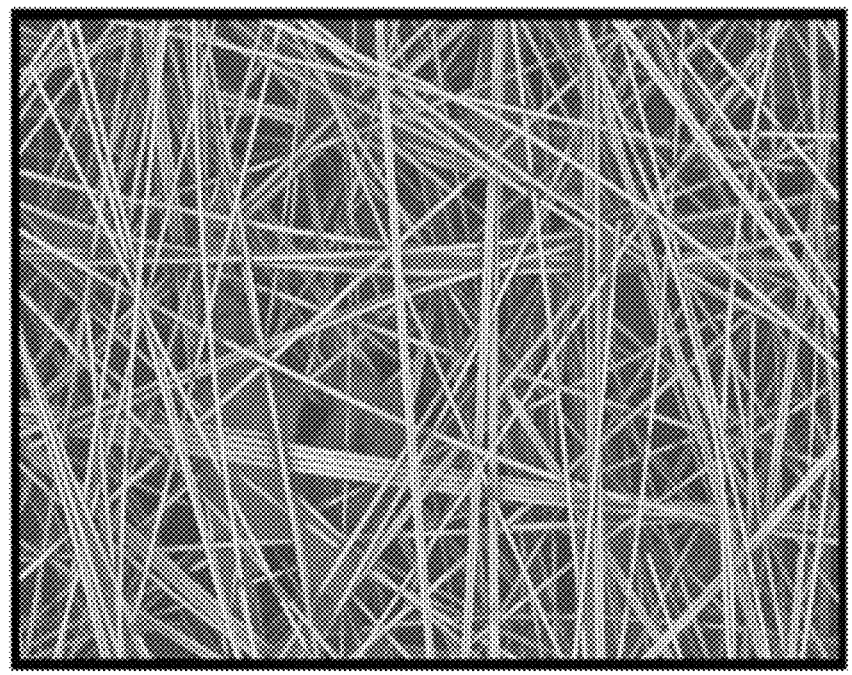
FIG. 3A shows Scanning Electron Microscope (SEM) image of a top layer of a glass fiber mat made with a binder composition that did not contain soy or an added thickening agent.
Figure 3B:
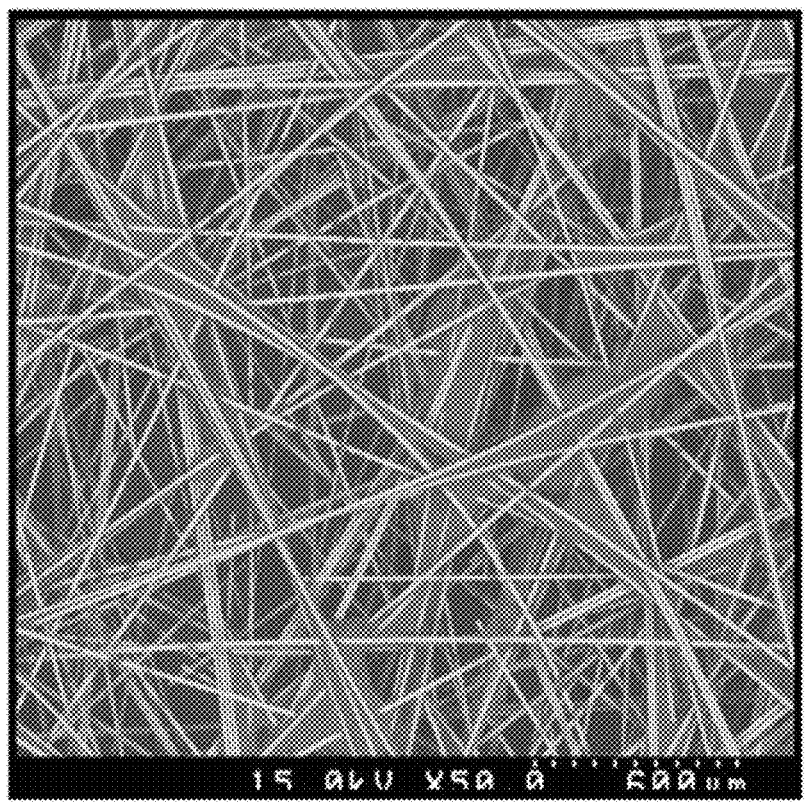
FIG. 3B shows Scanning Electron Microscope (SEM) image of a bottom layer of a glass fiber mat made with a binder composition that did not contain soy or an added thickening agent.

Loosely bonded top layers were observed in several glass fiber mats made using carbohydrate binder compositions that did not contain a soy protein or other thickening agents. FIGS. 3A and 3B show scanning electron microscope images of the top and bottom layers, respectively, of a glass fiber mat made with a carbohydrate-containing binder composition that did not contain soy or other thickening agents. The binder composition ("Binder 1") included Glyoxal:Urea:Dextrose formulation having a molar ratio of 1:1:5, and further included 5 wt. % $(NH_4)_2SO_4$+5 wt. % $(NH_4)_2HPO_4$ as a catalyst. The binder composition was diluted to 18 wt. % solids in water.

The figures show that the bottom layer (FIG. 3B) has significantly more cured binder than the top layer (FIG. 3A). For a 2.1 lb/sq mat sample, the top and bottom layers were separated and measured for binder content (loss-on-ignition (LOI) percentage). The LOI was 8.9 wt. % for the top layer shown in FIG. 3A, 23.9 wt. % for the bottom layer shown in FIG. 3B, and 21.3 wt. % for the intact glass mat. The mass percentage of the loosely bonded top layer was calculated at approximately 17%.

Figure 4A:
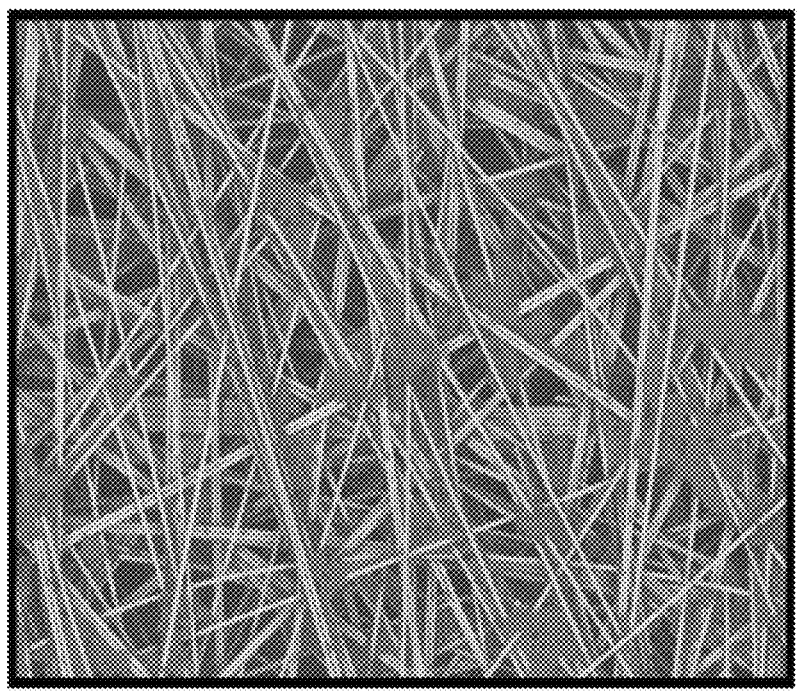
FIG. 4A shows Scanning Electron Microscope (SEM) image of a top layer of a glass fiber mat made with a binder composition containing 25 wt. % soy protein.
Figure 4B:
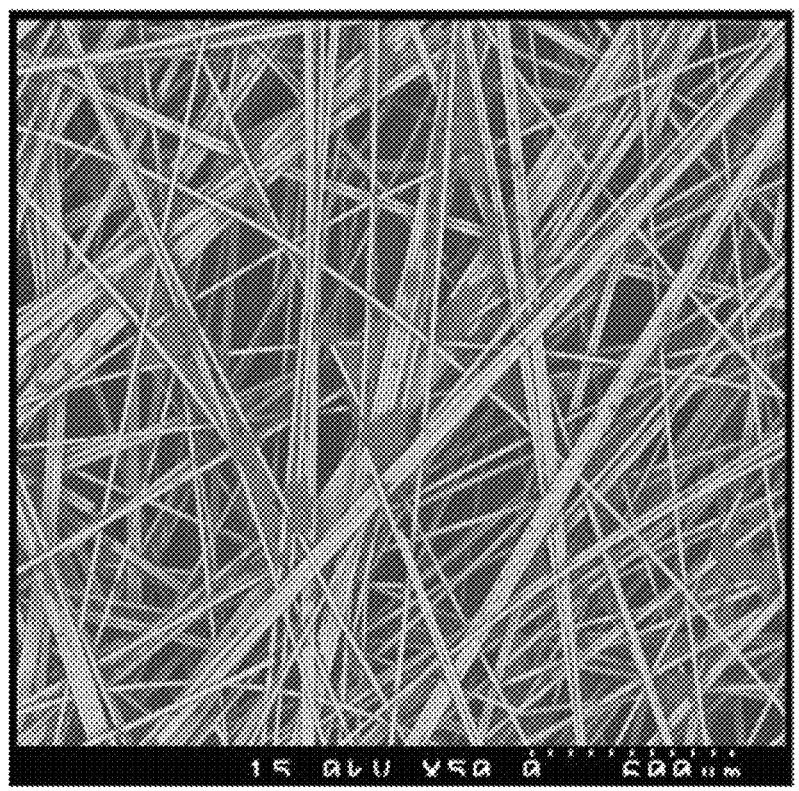
FIG. 4B shows Scanning Electron Microscope (SEM) image of a bottom layer of a glass fiber mat made with a binder composition containing 25 wt. % soy protein.

In contrast, FIGS. 4A and 4B show scanning electron microscope images of the top and bottom layers, respectively, of a glass fiber mat made with a soy-containing binder composition. The binder composition included a combination of 75 wt. % Binder 1 (described above) and 25 wt. % of a soy flour. The SEM images shown in FIGS. 4A and 4B clearly demonstrate uniform wetting of the glass fiber mat and the fiber junctions between the top layer (FIG. 4A) and the bottom layer (FIG. 4B).

The observations about the cured binder concentrations in the top and bottom layers of the glass mat indicate that the curtain coated binder composition made a significant migration through the top layer due to its low viscosity. Both gravity and vacuum suction are believed to make significant contributions to the migration of the binder compositions through the top layer glass mat.

Viscosity Measurements of Binder Compositions

Viscosity measurements were taken on a carbohydrate binder composition with and without the addition of soy flour or a thickening agent (hydroxyethylcellulose). Composition viscosities were measured with a rheometer (TA Instruments AR 2000).

The carbohydrate binder composition, referred to as Binder 2, had a molar ratio of [1,6-hexanediamine]:[Maleic anhydride]:Dextrose of 1:1:6, and 5 wt. % of $(NH_4)_2SO_4$ as a catalyst, and diluted in water to 16 wt. % solids. Viscosity measurements conducted on three different formulations of the carbohydrate binder: The first formulation was Binder 2 without the addition of soy flour or a thickening agent. The second formulation included 75 wt. % Binder 2 in combination with 25 wt. % soy flour. The third formulation included Binder 2 in combination with 0.12 wt. % hydroxyethylcellulose. The viscosities of all three binder formulations were measured at various shear rates and plotted on the graph shown in FIG. 5.

Figure 5:
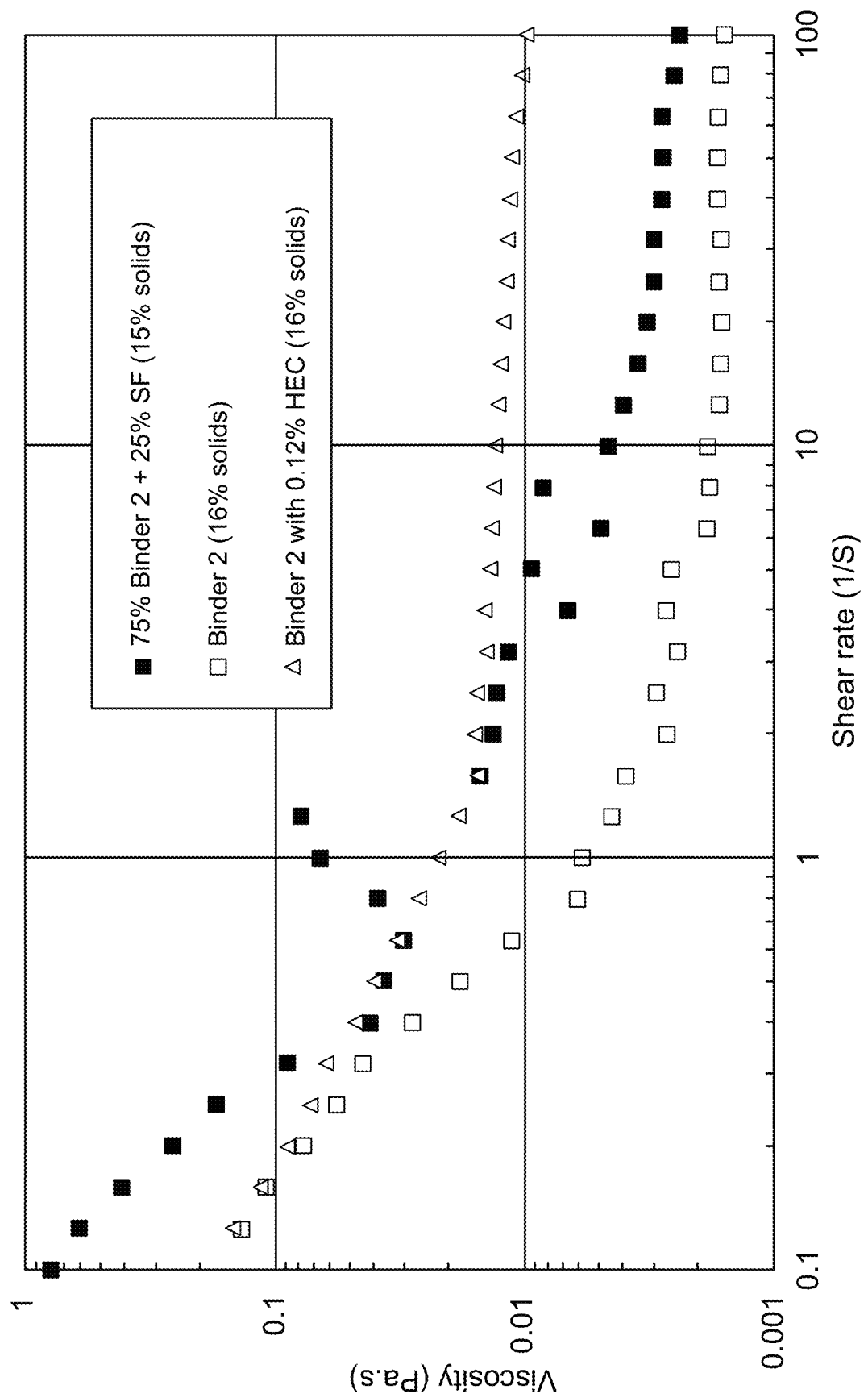
FIG. 5 shows a graph of viscosity versus shear rate for a series of binders, some of which contain a soy protein.

FIG. 5 shows that the soy flour significantly increased the viscosity of the carbohydrate binder composition, especially at lower shear rates. At higher shear rates however (e.g., ~80 $sec^{-1}$) the effect of the soy flour on viscosity diminished. While not wishing to be bound to a particular theory, it is believed that the increased viscosity of the carbohydrate binder formulations containing soy flour improve the uniformity of coverage between the top and bottom sides of a glass mat. The smaller gradient of binder concentration between the top and bottom sides of the mat can improve the quality of the finished mat in a number of ways, including increased laminate strength and increased total tensile strength.

Tensile Strength Measurements of Glass Mats Made with the Binder Compositions

Three pairs of glass fiber mats were compared to measure how the addition of a soy protein affected the tensile strength of the mats. The first mat of each pair was made with a carbohydrate-containing binder that was not combined with any soy protein. The second mat combined the carbohydrate-containing binder with soy flour in a 75 wt. % to 25 wt. % ratio.

The first pair of glass fiber mats used a binder composition described above as Binder 1. It included Glyoxal:Urea:Dextrose formulation having a molar ratio of 1:1:5, and further included 5 wt. % (NH$_4$)$_2$SO$_4$+5 wt. % (NH$_4$)$_2$HPO$_4$ as a catalyst. The binder composition was diluted to 18 wt. % solids in water. Additional details about this binder formulation can be found in Applicant's U.S. patent application Ser. No. 13/490,638, filed Jun. 7, 2012, the entire contents of which are herein incorporated by reference for all purposes.

The second pair of glass fiber mats used a binder composition described above as Binder 2. It included a molar ratio of [1,6-hexanediamine]:[Maleic anhydride]:Dextrose of 1:1:6, and 5 wt. % of (NH$_4$)$_2$SO$_4$ as a catalyst, and diluted in water to 16 wt. % solids. Additional details about this binder formulation can be found in U.S. Pat. No. 9,365,963, issued Jun. 14, 2016, the entire contents of which are herein incorporated by reference for all purposes.

The third pair of glass fiber mats used a binder composition ("Binder 3") having a molar ratio of Ethylene Diamine:Phosphoric Acid:Citric Acid:Urea:Dextrose of 1:1:0.5:1:6, and no catalyst, diluted in water.

The non-woven glass fiber substrates were made from ¾" K-glass fibers upon which the binder compositions were applied. The amount of added binder composition was set to produce mats having a final LOI of about 20%. The wet mats were then cured at 300-450° F. to form 1.4 lbs/sq glass fiber mats that were cut into 1"×6" sample pieces.

FIG. 6 is a graph of measured tensile strengths for the three pairs of glass fiber mats described above. For each mat, the graph shows tensile strength measurements in the machine direction (MD), the cross-machine direction (CMD), and the total dry tensile strength. As the data show, in most instances, the addition of the soy flour resulted in a 10%-25% increase in the total dry tensile strength of the mat. A significant portion (if not all) of the increase in tensile strength due to the addition of the soy protein is attributed to the more uniform distribution of the binder between the top and bottom sides of the mat, as shown in FIGS. 3A-B and 4A-B.

Having described several embodiments, it will be recognized by those of skill in the art that various modifications, alternative constructions, and equivalents may be used without departing from the spirit of the invention. Additionally, a number of well-known processes and elements have not been described in order to avoid unnecessarily obscuring the present invention. Accordingly, the above description should not be taken as limiting the scope of the invention.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included.

As used herein and in the appended claims, the singular forms "a", "an", and "the" include plural referents unless the context clearly dictates otherwise. Thus, for example, reference to "a process" includes a plurality of such processes and reference to "the fiber" includes reference to one or more fibers and equivalents thereof known to those skilled in the art, and so forth.

Also, the words "comprise," "comprising," "include," "including," and "includes" when used in this specification and in the following claims are intended to specify the presence of stated features, integers, components, or steps, but they do not preclude the presence or addition of one or more other features, integers, components, steps, acts, or groups.

What is claimed is:

1. A process of making a formaldehyde-free, non-woven glass-fiber product, the process comprising:
    providing a plurality of glass fibers;
    applying a soy-containing binder composition to the glass fibers to form a binder-containing wet mat; and
    curing the binder-containing wet mat to form the formaldehyde-free, non-woven glass-fiber product,
    wherein the soy-containing binder composition comprises:
        (i) a soy protein,
        (ii) dextrose; and
        (iii) a reaction product of a urea compound and a dialdehyde compound.

2. The process of claim 1, wherein a molar ratio of the reaction product of (i) the urea compound and the dialdehyde compound to (ii) the dextrose is 1:2 to 1:50.

3. The process of claim 1, wherein the soy protein is selected from the group consisting of soy flour, defatted soy flour, soy protein concentrate, soy protein isolate, and soy polymer.

4. The process of claim 3, wherein the soy protein is soy flour.

5. The process of claim 1, wherein the soy-containing binder composition further comprises a curing catalyst.

6. The process of claim 1, wherein the soy-containing binder composition further comprises a thickening agent.

7. The process of claim 1, wherein the soy-containing binder composition has a pH range of 6 to 8.

8. The process of claim 1, wherein the soy-containing binder composition has a solids concentration of 10 wt. % to 30 wt. %.

9. The process of claim 1, wherein the urea compound has a formula:

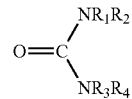

wherein $R_1$, $R_2$, $R_3$, and $R_4$ are independently chosen from a hydrogen moiety (H), an alkyl group, an aromatic group, an alcohol group, a ketone group, a carboxylic acid group, an alkoxy group.

10. The process of claim 1, wherein the dialdehyde compound has a formula:

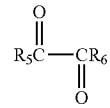

wherein $R_5$ and $R_6$ are independently chosen from hydrogen (H), an alkyl group, an aromatic group, an alcohol group, an aldehyde group, a ketone group, a carboxylic acid group, and an alkoxy group.

11. The process of claim 1, wherein the urea compound comprises urea and the dialdehyde compound comprises glyoxal.

12. The process of claim 1, wherein the reaction product of a urea compound and a dialdehyde compound is 4,5-dihydroxyimidazolidin-2-one.

* * * * *